Patented July 7, 1925.

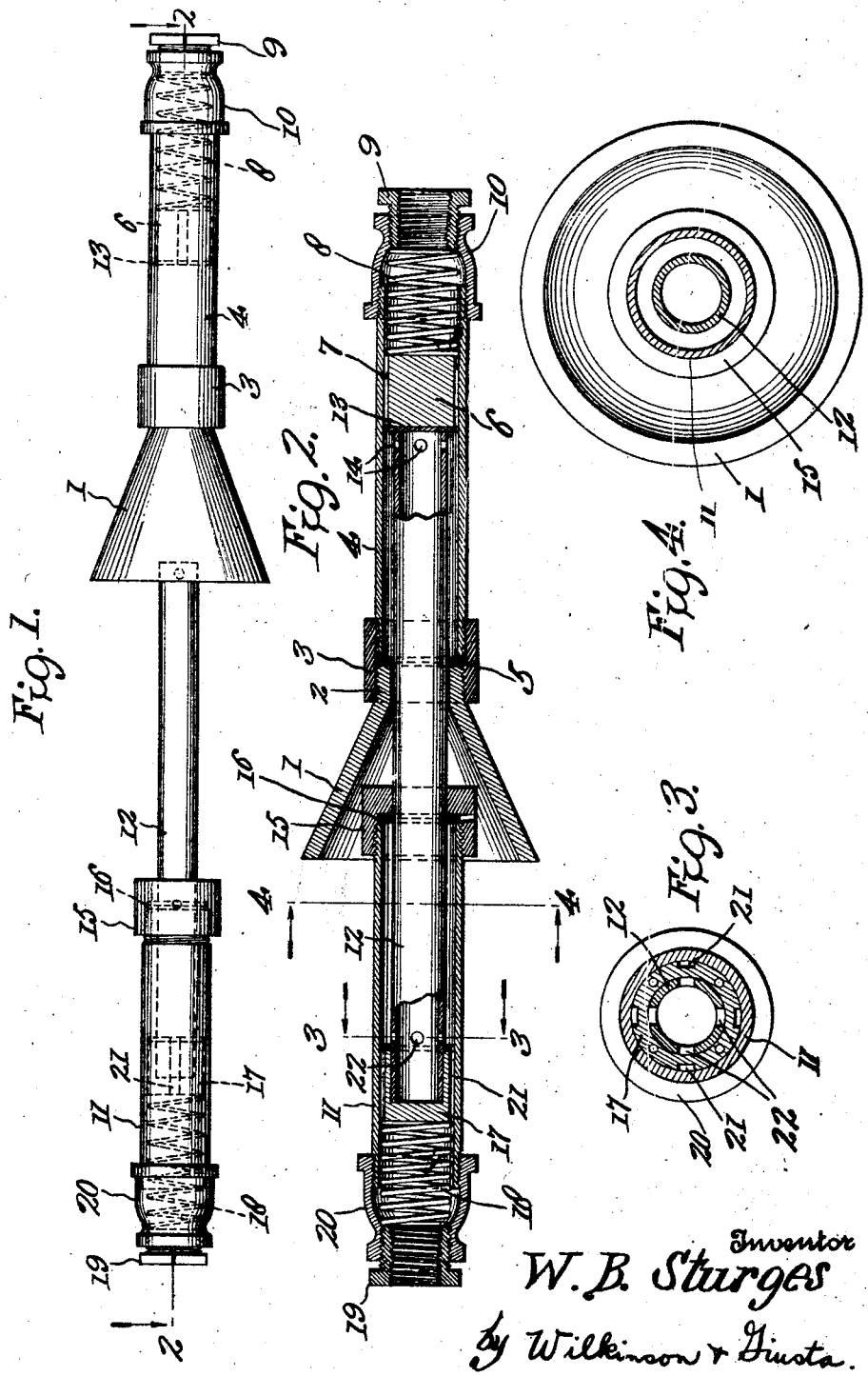

1,545,289

UNITED STATES PATENT OFFICE.

WILLIAM B. STURGES, OF HAZLEWOOD, LOUISIANA.

AUTOMATIC TRAIN-PIPE COUPLING.

Application filed October 10, 1921. Serial No. 506,699.

*To all whom it may concern:*

Be it known that I, WILLIAM B. STURGES, a citizen of the United States, residing at Hazlewood, in the parish of St. Landry and State of Louisiana, have invented certain new and useful Improvements in Automatic Train-Pipe Couplings; and I do hereby declare the following to be a full, clear, and exact description of the invention, such as will enable others skilled in the art to which it appertains to make and use the same.

The present invention relates to improvements in automatic train pipe couplings and has for an object to provide an improved automatic train pipe air coupling in which the coupling of the pipes will be effected automatically and will be held in air-tight tension during the time the cars are coupled, but which will permit of the pipes being readily separated also automatically when the cars are un-coupled and move apart.

Another object of the invention is to provide a simple and inexpensive construction consisting of two parts adapted to guide the pipes together upon the movement of cars toward one another and in which strong spring pressure will act to hold the parts in a yielding though leak-tight engagement.

With the foregoing and other objects in view, the invention will be more fully described hereinafter, and will be more particularly pointed out in the claim appended hereto.

In the drawings, wherein like symbols refer to like or corresponding parts throughout the several views, Fig. 1 is a side view of an automatic coupling construction according to the present invention and shown separated;

Fig. 2 is a sectional view taken on the line 2—2 in Fig. 1, but with parts coupled;

Fig. 3 is a cross sectional view taken on the line 3—3 in Fig. 2; and,

Fig. 4 is a transverse section taken on the line 4—4 also in Fig. 2.

Referring more particularly to the drawings, wherein only a single embodiment of the invention is shown, 1 designates a bell or conical collector having a shank part 2 screw threaded exteriorly to receive the interior threads at one side of a coupling collar 3 which also engages, as by screw threading, one of the train pipe sections 4. A suitable number of gaskets or washers 5 are placed between the adjacent ends of the gatherer cone 1 and pipe 4 to provide a leak-tight joint at this point.

In the pipe 4 is a plunger 6 fitted to reciprocate freely therein and having longitudinally disposed channels 7 on its outer edge to permit the passage of air from one side to the other of the plunger. The plunger 6 is moved outwardly under the influence of a coil spring 8 which bears directly upon the plunger at one end and against an adjusting screw 9 at its other end which is threaded into a coupling collar 10 threaded or otherwise removably secured to the other end of the pipe 4.

In a similar manner the adjacent end of the other car to be coupled carries a pipe 11 in which is slidably mounted an extension pipe 12 having its outer end left open and adapted to seat against a plate 13 on the forward end of the plunger 6, which likewise is provided with channels as shown to register with the channels 7 in the plunger. The extension pipe 12 is adapted to fit well within the pipe 4 and is provided with a series of ports 14 to permit of the escape and entrance of air from the pipe 12 to the interior of the pipe 4 and from the surrounding annular space in the pipe 4 into such pipe 12 which is of considerable lesser diameter than said pipe 4.

A nut or gland 15 is threaded upon the outer end of the pipe 11 and snugly though slidably receives the extension pipe 12, suitable washers 16 being interposed between the nut 15 and the end of the pipe 11, thus serving to prevent any leakage. The inner end of the pipe 12 is fitted in a plunger 17 which reciprocates within the pipe 11 and is urged forwardly by coil spring 18 adjustable by a threaded nut 19 movable back and forth in the coupling collar 20 which is carried on the inner end of said pipe 11.

Channels 21 are provided longitudinally in the outer edge of the plunger 17 to permit of passage of the air to opposite sides of the plunger in the pipe 11, and perforations 22 in any suitable number are disposed about the pipe 12 just forwardly of the plunger to set up a communication between the interior of such extension pipe 12 and the annular space surrounding the extension pipe 12 within the pipe 11.

In the operation of the device, the coil springs 8 and 18 normally hold the plungers outwardly for instance in the condition shown in Fig. 1. If desired, the plunger 17 may be moved so far forward as to abut against the washers 16, such washers closing the channels 21 and the ports 22 being closed by such washers, or by the nut 15 so that any escape of air is prevented. In like manner, the plunger 6 may be seated if desired against the washers 5 so as to close the pipe 4.

When two cars are moved together, the extension pipe 12 will strike the gathering cone 1 which will guide such extension pipe into the pipe section 4 and against the plunger 6. As the cars are moved together both plungers 6 and 17 will be shifted inwardly, compressing their coil springs and causing the pipes to seat yieldably yet tightly, the plungers being moved so as to permit a through communication between the pipes of the adjacent cars.

As soon as the cars are moved apart, the extension pipe 12 will be withdrawn from the pipe section 4 automatically and without necessity of a hand manipulation of a brakeman. The coil springs will return the parts to normal position where they will remain until the necessity for a further coupling for cars occurs.

It will be appreciated from the foregoing that I have provided an extremely simple construction for carrying out the automatic coupling of train pipe sections by the mere movement together of the pipe and cars and in which no attention need be given on the part of the train crew.

It is obvious that various changes and modifications may be made in the details of construction and design of the above specifically described embodiment of this invention without departing from the spirit thereof, such changes and modifications being restricted only by the scope of the following claim.

What is claimed is:

An automatic train pipe coupling comprising a pair of opposed train pipes, a plunger mounted in each pipe, springs in the inner ends of said pipes bearing against the respective plungers for normally urging the same toward the outer ends of the pipes, a bell mouth carried upon one pipe, a tube mounted on the plunger of the other pipe and adapted to enter said bell and the pipe thereof and detachably engage the other plunger, said bell having an inwardly facing stop shoulder at its inner end, packing arranged against said stop shoulder, said packing being adapted to receive the adjacent plunger when the latter is moved outwardly by its spring to close said pipe, a head on the outer end of the other pipe adapted to enter said bell mouth and having an inwardly facing stop shoulder, packing against said stop shoulder of the head for sealing the tube in its pipe, the adjacent plunger being adapted to seat against said packing under tension of its spring and for sealing the other pipe, said tube having openings near its opposite ends for intercommunicating the tube with said pipes.

WILLIAM B. STURGES.